United States Patent [19]

Webb et al.

[11] Patent Number: 5,373,615
[45] Date of Patent: Dec. 20, 1994

[54] FILTRATION SCREEN

[75] Inventors: Ian Webb, Star City; Ronald A. Findlay, Pine Bluff, both of Ark.

[73] Assignee: National Filtration, Star City, Ark.

[21] Appl. No.: 937,729

[22] Filed: Sep. 1, 1992

[51] Int. Cl.⁵ ................... B23P 15/22; B01D 39/12
[52] U.S. Cl. .................... 29/163.8; 29/527.2; 29/902; 55/525; 55/DIG. 5; 140/149; 210/494.2; 210/499; 427/244; 427/247
[58] Field of Search ............ 140/3 R, 30, 149; 29/163.8, 527.2, 902; 156/148, 393, 118; 427/244, 247, 434.6, 405; 55/525, DIG. 5; 210/494.1, 494.2, 499, 402

[56] References Cited

U.S. PATENT DOCUMENTS

| | | | |
|---|---|---|---|
| 2,334,263 | 11/1943 | Hartwell | 210/494.2 |
| 2,640,789 | 6/1953 | Hausner | 427/247 |
| 3,640,760 | 2/1972 | Nichols | 117/99 |
| 3,880,513 | 4/1975 | Fotland | 355/3 |
| 3,963,605 | 6/1976 | Seabourn | 209/2 |
| 4,002,540 | 1/1977 | Bixby | 204/24 |
| 4,060,648 | 11/1977 | Taylor-Brown et al. | 427/32 |
| 4,075,880 | 2/1978 | Copeland | 140/149 |
| 4,111,744 | 9/1978 | Reiniger | 162/100 |
| 4,132,250 | 1/1979 | Brown et al. | 140/149 |
| 4,138,303 | 2/1979 | Taylor, Sr. | 156/264 |
| 4,143,965 | 3/1979 | Ando et al. | 355/35 |
| 4,265,982 | 5/1981 | McCreary et al. | 427/247 |
| 4,313,992 | 2/1982 | Spiewok | 428/136 |
| 4,470,859 | 9/1984 | Benezra et al. | 156/155 |
| 4,552,810 | 11/1985 | Norota et al. | 428/398 |
| 4,564,450 | 1/1986 | Piper et al. | 210/293 |
| 4,664,953 | 5/1987 | Copas et al. | 427/434.6 |
| 4,680,221 | 7/1987 | Murayama et al. | 428/246 |
| 4,954,268 | 9/1990 | Just et al. | 210/772 |
| 5,141,101 | 8/1992 | Vance et al. | 198/847 |

*Primary Examiner*—Robert A. Dawson
*Assistant Examiner*—W. L. Walker
*Attorney, Agent, or Firm*—Cushman, Darby & Cushman

[57] ABSTRACT

A caul screen is made with metal cable having a low twist level of between 1 and 5 turns per inch and where the cable is made with filaments that have been coated with brass; the cable is woven into a mesh to form the screen.

3 Claims, 1 Drawing Sheet

FILTRATION SCREEN

FIELD OF THE INVENTION

The present invention relates to filtration or caul screens used in strand board or other similar manufacturing processes and, more specifically, for a caul screen used for transporting and simultaneously filtering a mixture or slurry of wood chips, bark and other elements present in the raw material and liquids.

BACKGROUND OF THE INVENTION

In many board or plywood manufacturing processes, especially those employed for the manufacture of strand board, a raw material must be treated in various stages requiring transportation between and through the stages. In the conventional systems, transportation, washing and filtering of the wood chips, barks and other particles are carried out on a filtering or caul screen which functions to both transport the material through the various processing stages and also to filter liquid material such as a wash liquid which may include conditioning chemicals such as acids through the screen to maintain the desired flow density in the slurry. In addition, the material is subjected to high temperature steam and pressure.

In the past, such screens have been made from woven carbon steel wire formed into a cable from a number of wires where the twists in the thus formed cable have been on the order of 6 to 8 twists per inch. Unfortunately, the increasing throughout speeds of the strand board manufacturing equipment and the nature of the use of such screens both in terms of the collision impacts with the wood chips and bark but also the chemicals and temperatures to which the screens are exposed, has undesirably foreshortened the useful life of such screens. As one result of production costs are increased since the removal, repair and reinstallation of repaired or new screens is a very time consuming and labor intensive process.

SUMMARY OF THE INVENTION

The present invention is based on the discovery that the durability and life of such screens can be greatly enhanced by employing two relatively inexpensive manufacturing techniques for the cable wire to be used in making the woven screens. Specifically, it has been found that by reducing the twists per inch of the metal cable and by coating the carbon steel wire with brass prior to cabling and weaving the filter screens, a number of significant advantages result which are wholly unexpected. As an example, the lower twists per inch of the cable used in weaving the filter screen gives a substantially more flexible woven wire conveyor with substantially less resistance in movement and substantially longer product life.

Other advantages and economies will become apparent as consideration is given to the following detailed description taken in conjunction with the accompanying drawings, in which:

DETAILED DESCRIPTION OF THE INVENTION

In many, if not all of the cellulose based manufacturing processes, heavy concentrations of strong acids are used to bleach or otherwise condition the wood chips and other wood constituents before formation into the final product. As a consequence, as noted above, the useful life of the wire screens previously employed has been relatively short as the screens rapidly deteriorated with the increasing production speeds and higher concentrations of chemicals and higher temperatures that have come into use in, for example, board or plywood manufacturing.

In order to accommodate the higher production speeds, it has been believed necessary to reduce the weight of the wire filaments utilized in weaving the filter screens in order to enhance flexibility and reduce weight. However, with reduction in the diameter of the wire filaments, the life of the screen will be correspondingly diminished in the prior art structures where such diameters have been on the order of 0.007 inches. According to the present invention, the carbon steel wires presently used in the construction of caul screens are first coated with a material that is resistant to corrosion or abrasion induced breakdown upon contact with the chemicals in the slurries or solids utilized in the production process. A coating that has been found particularly useful and relatively inexpensive to apply is brass. Conventional coating techniques such as dipping are readily available. One may also coat by continuously running a strand into a bath or in certain applications, batch dipping of a wound spool may also be employed.

Prior to weaving the filter screen, the wire filament employed in the weaving, typically on the order of 0.007 inches in diameter, is formed into a multi-strand cable with typically seven filaments or strands having an overall diameter of approximately 0.021 inches. The cable is then twisted to the level of between one and five turns per inch and preferably at the level of two twists per inch. Also, it has been found advantageous in terms of durability and flexibility to twist the warp strands of the woven screen to a different level than the weft strands. For example, a twist level of two turns per inch for the weft strands with the twist in the warps strand ranging from 1 to 5 turns per inch is acceptable for greater flexibility.

Figure 1:
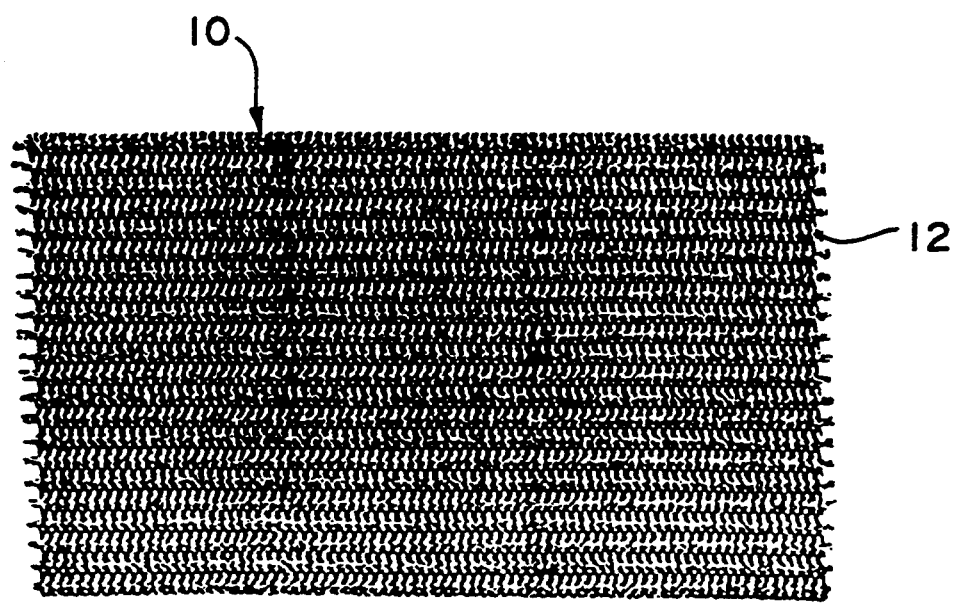
FIG. 1 is a top plan view of a portion of a caul screen of the type to which the present invention is applicable.

The twisted cables of coated wire filaments are then woven using a conventional metal wire weaving machine into the screen formation 10 as illustrated in FIG. 1. In the screen formation 10, the weft strands, one of which is indicated at 12, are usually slightly heavier cabled filaments since, in use, these are subjected to much less bending and, in some cases, the weft filaments 12 carry much of the weight of the screen and the material carried by the screen in the board making process.

The warp strands are those that extend transverse to the weft strands 12 and are formed in a conventional weave pattern as illustrated in FIG. 1.

Figure 2:
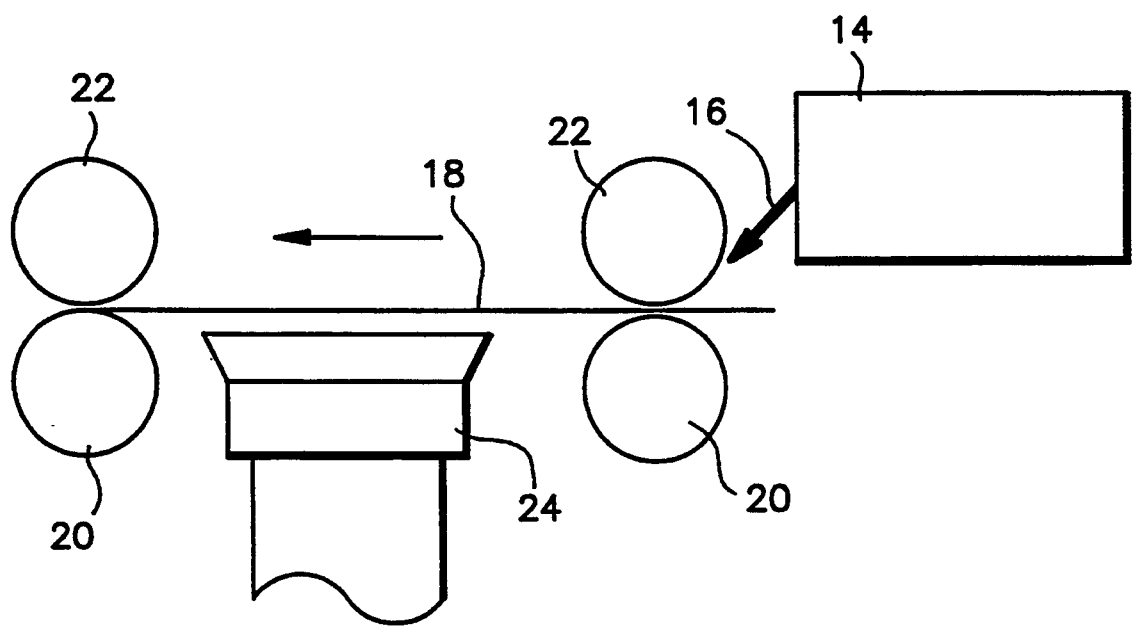
FIG. 2 is a portion of a transport conveyor utilizing a caul screen in a segment of a manufacturing production line.

In practically all production facilities, the filter screen such as illustrated in FIG. 1 at 10 is formed in endless belt constructions or platen presses and are suspended between a plurality of rollers, some of which are driven, to effect transport of material from one point in the production facility to another point. As shown schematically in FIG. 2, a source of raw wood product material such as wood chips and bark deposits from a supply 14 in the direction of arrow 16 onto a filter screen conveyor 18 which may be of a construction as shown in FIG. 1. The filter screen 18 has its outer edges engaged between opposing pairs of rollers usually comprising upper and lower sets such as illustrated at 20 and 22. Either or both rollers may be driven by a suitable motor (not shown). The portion of the screen 18 between the opposite edges which are held by the rollers 20 and 22 is unobstructed. In several sections of a conventional board manufacturing process, a liquid slurry is deposited at 16. In a conventional machine, the screen 18 will carry the slurry through a sequence of steps including over suction nozzles such as the one illustrated schematically at 24 and which functions to remove liquid to densify the slurry on the upper surface of the screen 18 as it is passed through a series of rollers and treatment steps to form the board. Other steps will include pressure vessels and may include heated plates to form the board. The screen itself is therefore subjected to pressure and chemicals as well as heat in the process.

With a filtering screen made according to the present invention, a user will have a conveying surface that is smooth and much easier to clean and will exhibit increased thermal conductivity and provide a non-carbonizing finish. As a result of the low twist per inch of the cable made from the coated wire filaments, the screen will exhibit substantially greater flexibility and less tendency to break for the individual filaments thereby contributing to the non-snagging operation of the filter screen.

While the foregoing has been a description of a preferred embodiment, it will be apparent to those skilled in this art that various modifications may be made thereto without departing from the spirit and scope of this invention as defined in the appended claims. For example, while the use of the filter screen of this invention has been described in conjunction with the wood board manufacturing process, it will be readily apparent that the invention is readily applicable to other uses.

What is claimed is:

1. A method of making a filter screen of the type used in conveying liquid bearing material comprising the steps of:
    coating metal wire filaments with an abrasion resistant material,
    forming a cable of the coated metal wire filaments,
    twisting the cable to a twist level between one and five turns per inch, and
    subsequently weaving the twisted cable into a screen form.

2. The invention as claimed in claim 1, including using a twist level of two turns per inch.

3. The invention as claimed in claim 1, wherein the step of coating includes using brass as the abrasion resistant material.

* * * * *